United States Patent
Alperovich et al.

(10) Patent No.: US 6,835,431 B1
(45) Date of Patent: Dec. 28, 2004

(54) FLUORESCENT COMPOSITION FOR THE MANUFACTURE OF CD-ROM TYPE OPTICAL MEMORY DISKS

(75) Inventors: Mark Alperovich, Ashdod (IL); Eugene Levich, New York, NY (US); Irene Zuhi, Ashdod (IL)

(73) Assignee: D Data Inc., New York, NY (US)

(*) Notice: Subject to any disclaimer, the term of this patent is extended or adjusted under 35 U.S.C. 154(b) by 0 days.

(21) Appl. No.: 09/530,114

(22) PCT Filed: Nov. 6, 1998

(86) PCT No.: PCT/US98/23625

§ 371 (c)(1),
(2), (4) Date: Sep. 18, 2001

(87) PCT Pub. No.: WO99/24527

PCT Pub. Date: May 20, 1999

Related U.S. Application Data

(60) Provisional application No. 60/064,388, filed on Nov. 7, 1997.

(51) Int. Cl.$^7$ ................................................. B32B 3/02
(52) U.S. Cl. .................... 428/64.1; 428/64.4; 428/64.8; 428/690; 430/270.14
(58) Field of Search ............................... 428/64.1, 64.4, 428/64.8, 690, 913; 430/270.14, 495.1, 945

(56) References Cited

U.S. PATENT DOCUMENTS

| | | | |
|---|---|---|---|
| 4,547,444 A | * 10/1985 | Bell | ............................... 430/11 |
| 4,767,693 A | * 8/1988 | Oba | ............................ 430/270 |
| 4,927,681 A | 5/1990 | Chikuma | |
| 5,075,147 A | * 12/1991 | Usami | ........................... 428/64 |
| 5,205,963 A | 4/1993 | Brito et al. | |
| 6,039,898 A | * 3/2000 | Glushko | ..................... 264/1.33 |

* cited by examiner

*Primary Examiner*—Elizabeth Mulvaney
(74) *Attorney, Agent, or Firm*—Blank Rome LLP

(57) ABSTRACT

A CD-ROM type optical disk, whether single-layer or multi-layer, is formed on a substrate having pits in its surface. The pits are filled with a fluorescent composition. Multiple disks such as that one can be glued on top of one another. Suitable fluorescent compositions include xanthene dyes of the eosine group, xanthene dyes of the rhodamine group, acridine dyes, oxazine dyes, azine dyes, indigoide dyes, perylene dyes, violanthrone dyes, cyanine dyes, phthalocyanine dyes, and porphyrins.

26 Claims, No Drawings

FLUORESCENT COMPOSITION FOR THE MANUFACTURE OF CD-ROM TYPE OPTICAL MEMORY DISKS

This application claims the benefit of provisional application No. 60/064,388, filed Nov. 7, 1997.

FIELD OF THE INVENTION

This invention relates generally to optical materials for, and to a method of, forming optical memory discs of the CD-ROM type for use with fluorescent reading, including disks for three-dimensional (3D) optical memory systems.

BACKGROUND OF THE INVENTION

To date, digital information carriers for recording, storing, and reading sound and images by optical methods have received wide recognition.

Generally, information is written in the form of local changes to the active medium optical thickness or the reflection coefficient, while reading is performed using laser emission and is based on the laser beam phase or amplitude changes in information record centers.

CD-ROM's are the least expensive and most sophisticated of the optical information carriers. However, both the storage volume and the signal-to-noise ratio of currently used CD-ROM's are inadequate for the new generations of computers and video systems now under development.

Therefore, materials for better optical memory systems are being actively developed. These materials are required to provide an increased data density, a high signal-to-noise ratio, an improved operation and storing stability, and low costs.

A promising approach to the increase of optical information carrier capacity consists of increasing the number of information bits per active layer by shortening the pits and increasing their amount, and producing multilayer disks.

This approach is implemented in the DVD standard disks that have recently appeared on the market. In these disks, the pit size is halved and the number of active layers is increased to 4, two on each side of the substrate. This has enabled the disk capacity to be increased up to 20 GB.

However, when reflection coefficient changes are used for reading, further increase of the number of disk active layers results in a sharp cost increase of the system and deterioration of data retrieval quality. As a result, attempts to increase the disk capacity fail.

Known in the prior art are Japanese patent publications [JP 63-195,838 (Aug. 12, 1988); JP 02-308,439 (Dec. 21, 1990)] suggesting a fluorescent reading method. The concept of this method is that after the writing process the information record centers do not fluoresce, whereas the background does. When reading with a corresponding laser beam, the fluorescent light is excited and registered with a detector.

The above references suggest laser beam recorded optical disks which are of the WORM (write once, read many) type and thus cannot be used as CD-ROM type disks. Additionally, the optical disks proposed in the first of the above references are so constructed that the active layer is deposited on a dull substrate surface. This technology prevents the production of multilayer disks, because light excited on reading is subject to strong scattering.

Materials based on photochromic compounds, preferably spirobenzopyrans, contained in a polymer matrix, were suggested by D. A. Pathenopulos, and R. M. Rentzepis, *Science*, 245, 843 (1989); and R. M. Rentzepis, U.S. Pat. No. 5,268,862 (Dec. 7, 1993) to be used as 3D optical memory medium where multilayer data writing and fluorescent reading are performed. With these materials, information is written by the two-photon excitation of the initial non-fluorescing form A of the photochromic compound, this excitation being produced by two focused laser beams intersecting in definite locations of active medium.

Under excitation, form A transforms to form B. Form B absorbs two reading emission photons and emits the fluorescent light which is absorbed by a detector. Materials of this type are intended for repeatedly rewritten memory, because heating or irradiation results in erasing data due to the transformation of form B to initial form A.

A practical implementation of 3D optical memory concepts and methods, as suggested by U.S. Pat. No. 5,268,862, is quite problematic and highly improbable for a number of reasons, including, in particular, the following:

A low photochemical and thermal stability of suggested photochromic compounds resulting in their destruction after repeated writing—reading—erasing cycles.

The possibility of erasing data (form B to form A transition) in the process of fluorescence reading.

A low quantum yield of merocyanine form B of suggested photochromic spiropyrans.

For the above reasons, the 3D optical memory devices proposed in U.S. Pat. No. 5,268,862 are unsuitable for CD ROM type multilayer disks as well.

The use of organic dyes in optic WORM disks is known D. J. Gravesteijn, J. van der Veen, *Philips Tech. Rev.*, 41 (1983/1984), 325; J. E. Kuder, *J. Imag. Technol.*, 12 (1986), 140; J. E. Kuder, *J. Imag. Sci.*, 32 (1988), 51.

The most frequently used to produce WORM disks active layers are cyanine dyes in JP 08-108,630 (Apr. 30, 1996); JP 07-186,530 (Jul. 25, 1995); JP 06-336,086 (Dec. 6, 1994); JP 06-227,138 (Aug. 16, 1994); phthalocyanines Brit. UK Pat. Appl. GB 2,290,489 (Jan. 3, 1996); JP 07-166,082 (Jun. 27, 1995); Ger. Offen. DE 4,310,917 (Oct. 7, 1993) and porphyrins JP 08-127,174 (May 21, 1996); JP 07-304,257 (Nov. 21, 1995) herein incorporated by reference.

The majority of dyes belonging to these classes exhibit satisfactory fluorescence capacity in polymer matrices provided that true solutions have been formed, i.e. dyes are present in the polymer in a molecularly dispersed state.

In existing WORM disk technology, dyes are usually applied to a grooved substrate by spin coating or another method, e.g. vacuum evaporation, in the form of polycrystalline or amorphous opaque thin films having a thickness of about 10 nm. For this reason, and due to the fact that the laser wavelength being used for reading by the reflection coefficient variation method may not coincide with the dye absorption maximum, the dye concentration of the active layer should be as high as possible. In such layers the dyes used do not fluoresce. In some cases, to obtain dye layers for WORM disks, polymer binders are used, M. S. Gupta, "Laser Recording on an Overcoated Organic Dye-Binder Medium", *Applied Optics*, 23(22), Nov. 15, 1984; K. Y. Law et al., "Ablative Optical Recording Using Organic Dye-in-Polymer Films", Appl. Phys. Lett., 36(11), Jun. 1, 1980; U.S. Pat. No. 5,348,841 (Sep. 20, 1994); JP 07-126,559 (May 16, 1995). In dye-in-polymer films of WORM disks, dyes are only partially dissolved in the polymer matrix, the major part of the dyes staying in the form of aggregates and solid particles. This sharply reduces their fluorescence capacity.

Therefore, dye layers, both with and without a polymer binder, used in WORM disks with the reading based on the variation of reflection coefficient, cannot be used in optical CD-ROM type memory disks with a fluorescence reading.

SUMMARY OF THE INVENTION

It is an object of the invention to provide a fluorescence-based reading method that has a number of advantages over methods based on the variation of reflection coefficient, even in the case of single-layer disk.

It is another object of the invention to reduce the precision requirements to pit production as compared to existing CD-ROM's. For example, changing the pit size by 100 nm does not hinder reading from the fluorescence disk, while resulting in the complete disappearance of the reflection disk signal.

It is a further object of the invention to provide fluorescence disk insensitivity to disk plane tilt variations up to 1°, which is absolutely inadmissible for the reflection disk.

It is a still further object of the invention to provide a 3D optical memory carrier in the form of a multilayer disk.

To achieve these and other objects, the construction principle of a multilayer optical disk with fluorescence-based reading is as follows B. Glushko, U.S. Provisional Patent Application No. 25457, Aug. 5, 1997 herein incorporated by reference. Single-layer optical disks with pit-filling fluorescent material as information carrier are sequentially superimposed on one another so that a multilayer system is formed, where active layers consisting of fluorescing pits 0.5 to 1 $\mu$m deep alternating with inactive separation layers 20 to 50 $\mu$m thick, the latter being transparent for both the excitation laser light and the fluorescence light.

To produce a multilayer optical disk with fluorescence-based reading, a fluorescent composition meeting a number of specific requirements is used. The most important of these requirements are as follows:

1. The absorption bandwidth of the fluorescent compound should coincide with the emission wavelength of a laser used for reading.
2. The material should have the maximum possible quantum yield of fluorescence which will not decrease in long-term storage and operation.
3. To avoid over-absorption of fluorescence light, the overlay of the absorption and fluorescence bands should not be too large.
4. The fluorescent composition should not scatter the excitation laser emission and fluorescent light passing through it.
5. The fluorescent dye should be readily compatible with a matrix, forming a true solution of the needed concentration in the matrix, and should not migrate from it.
6. The fluorescent composition should penetrate the pits easily and not color space among the pits.
7. The solution used for filling pits must not interact with a pit-containing substrate and change the geometric parameters of the pits.
8. The refraction index of the fluorescent composition must be close to that of a pit-containing substrate.
9. When storing and using a multilayer disk with pits that contain fluorescent composition, the properties of the disk must not change.

Still another object of the present invention is to develop a fluorescent composition exhibiting physical and physicochemical properties needed for use in CD-ROM type optical disks, including those intended for a 3D optical memory with fluorescence reading, where data carriers represent pits filled with fluorescent composition.

This fluorescent composition consisting of fluorescent dye, film-forming polymer, organic solvent, plastifier and (if necessary) surfactant and light stabilizer provides forming active layers of CD-ROM's with fluorescence reading, free from the drawbacks of prior art optical disks with active layers based on polymer films containing organic dyes.

This object is achieved by devising a composition including:

A fluorescent dye whose absorption band coincides with the wavelength of the laser emission used for reading, this dye having a high quantum yield of fluorescence, forming a true solution with a polymer matrix and not migrating from the matrix;

A film-forming polymer which exhibits a high transparency and does not scatter the laser emission and fluorescent light passing through the active layer, penetrates the substrate pits well and can easily be removed from the substrate;

An organic solvent that provides good solubility of the fluorescent composition components, wets the pit-containing substrate surface, does not interact with substrate material and does not produce deformation of pits;

A plastisizer which increases the elasticity of composition and helping its penetration into the pits.

Also, if necessary, the composition may be completed with surfactants that reduce the surface tension of the composition and thus improve substrate surface wetting and penetration of the solution into the pits; and with light-stabilizers, contributing to the preservation of optical and spectral luminescence properties of the fluorescent composition in the storage and use of optical disks.

After being applied to the substrate and dried, the fluorescent composition has a refractive index close to that of substrate.

BRIEF DESCRIPTION OF THE DRAWINGS

Various preferred embodiments of the present invention will now be set forth in detail with reference to the drawings, in which:

FIG. 1 shows a cross-sectional view of a portion of an optical disk according to a preferred embodiment of the present invention during an intermediate stage in its formation; and FIG. 2 shows a cross-sectional view of a portion of the completed optical disk.

DETAILED DESCRIPTION OF THE PREFERRED EMBODIMENTS

The CD-ROM multilayer optical disk of the invention is shown in FIG. 1 wherein a substrate 1 having pits 3 is filled with a fluorescent composition 5 having the properties described herein. The multilayered structure can be formed by either glueing at least one other layer of substrate 9 to the substrate 1 by the adhesive layer 7. The adhesive is preferably a UV of photo cured adhesive that is cured with light ray 11. Alternatively, layers of substrate 9 can be cast or coated onto substrate 1 as long as the casting or coating process does not disturb the previously formed layer with pits filled with the fluorescent composition. A multi layered optical disk is shown in FIG. 2 the disk 13 as shown has ten layers.

The fluorescent composition used for the manufacture of CD-ROM type optical disks, including those intended for the 3D optical memory with fluorescence reading, where pits filled with this fluorescent composition play the role of data carriers, is produced as follows:

First, solutions of fluorescent dye, film-forming polymer, plastisizer, surfactant and light-stabilizer in appropriate solvents are prepared.

Then these solutions are mixed together, homogenized and filtered. After deaeration, a transparent solution is obtained with the following concentration values: film-forming polymer 0.2–5.0 wt. %, fluorescent dye 0.001–0.1 mole/kg, plastisizer 1.0–50 wt. % w.r.t. the polymer, surfactant 0.01–2.0 wt. % w.r.t. the polymer, and light-stabilizer 0.1–2.0 wt. % w.r.t. the polymer. The fluorescent composition solution is applied by spin coating, roller coating, or dip coating to the surface of substrate representing a pitted disk made from polycarbonate or PMMA.

The coating is applied so that the pits are filled with the composition, while the substrate surface among the pits remains uncolored and does not fluoresce. When necessary, the remaining fluorescent composition is removed from the substrate surface by rinsing with a solvent or mechanically.

To produce a multilayer disk intended for the 3D optical memory with fluorescence reading, single-layer disks whose pits are filled with fluorescent composition are sequentially glued to one another in such a way that the active layers consisting of fluorescent pits 0.1–1.0 $\mu$m deep (preferably, 0.3–0.5 $\mu$m deep) alternate with inactive separation layers 20 to 50 $\mu$m thick, these layers being transparent for the laser excitation and fluorescent light wavelengths.

The following compounds are used for fluorescent dyes:

1. Xanthene dyes of the eosine group, including fluorescine, eosine, erythrosine, dichlorofluorescine of the general structure I

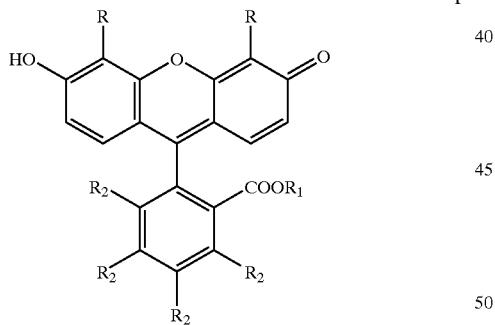

where R stands for H, Cl, Br, or I; $R_1$ stands for H, Na, Alk; and $R_2$ stands for H, Cl.

2. Xanthene dyes of the rhodamine group, including rhodamine B, 3B, C, G, 6G, 101, of the general structure II

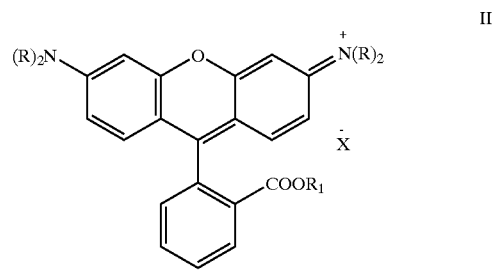

where R stands for H, $CH_3$, $C_2H_5$, $CH_2COOH$, $C_2H_4OH$; $R_1$ stands for H, Na, $CH_3$, $C_2H_5$, Ar; and X is an anion selected from $Cl^-$, $Br^-$, $I^-$, $F^-$, $HCO_2^-$, $CH_3CO_2^-$, $ClO_4^-$.

3. Acridine dyes of the general structure III

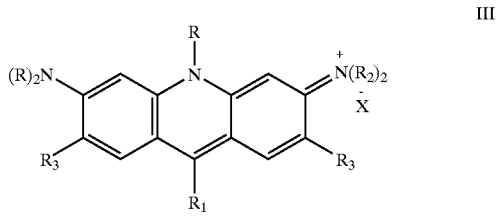

where R stands for H, $CH_3$, $C_2H_5$; $R_1$ stands for H, $C_6H_5$; $R_2$ stands for H, Alkyl; $R_3$ stands for H, $CH_3$; and X is an anion selected from F, Cl, Br, I, HCOO, $CH_3CHOHCOO$, $ClO_4$, etc.

4. Oxazine dyes of the general structure IV

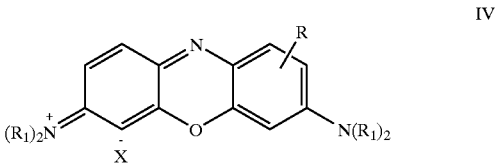

where R stand for H, $CH_3$, and benzo-group; $R_1$ stands for H, $CH_3$, $C_2H_5$; and X is an anion selected from Cl, Br, I, $HCO_2$, $CH_3CHOHCO_2$, $ClO_4$, etc.

5. Azine dyes of the general structure V

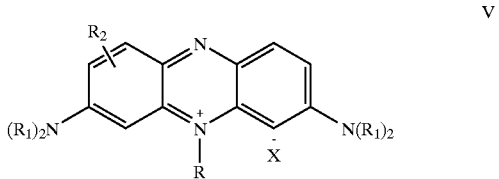

where R stands for phenyl, naphthyl; $R_1$ stands for H, alkyl, phenyl; $R_2$ stands for H, benzo-group; $R_3$ stands for H, $SO_3H$; and X is an anion.

6. Indigoide dyes of the general structure VI

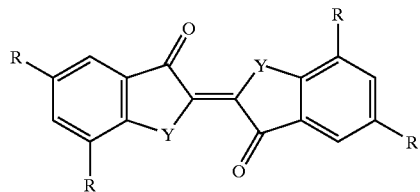

where Y stands for S, NH; R stands for H, Cl, Br, I, Oalkyl, Oaryl etc.

7. Perylene and violanthrone dyes containing structures VII and VIII

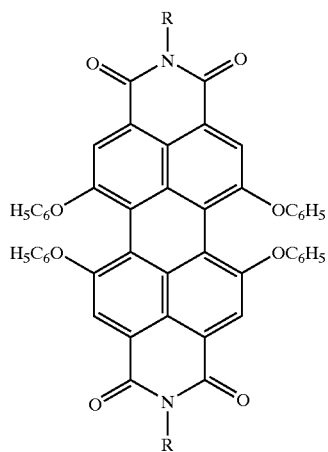

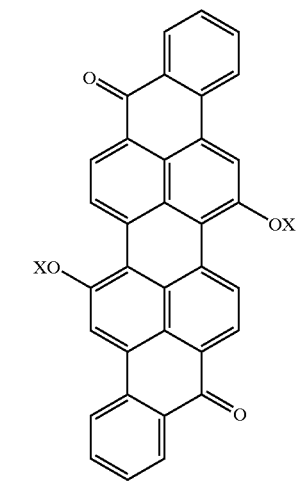

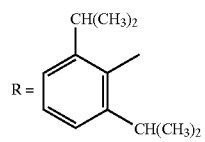  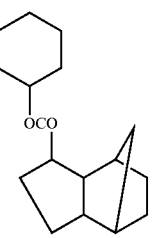

8. Cyanine dyes of the general structure IX

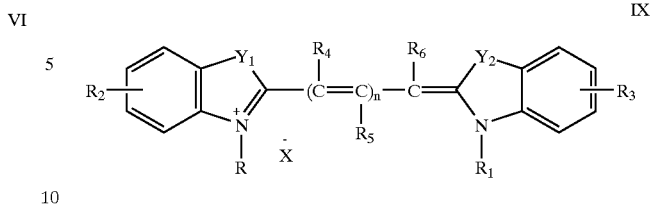

where $Y_1=Y_2$, $Y_1\ne Y_2$, $Y_1$ and $Y_2$ stand for O, S, N-Alk, —Ar, $C(CH_3)_2$; R and $R_1$ stand for Alk, Ar; $R_2$–$R_3$ are various substituents, including those forming cyclic groups; X is an anion; N=1–3

9. Phthalocyanine dyes containing the structure X

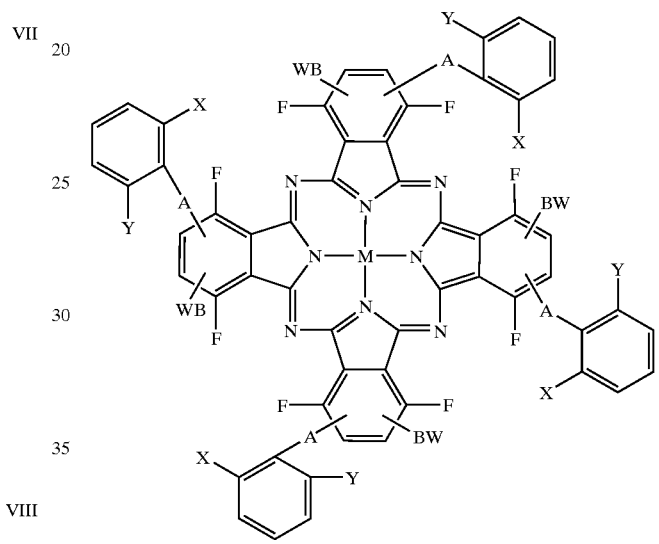

where A, B stand for O, S; W stands for Alk; X stands for COOR; Y stands for Alk, AlkO, COOR; M stands for 2H, metal, metal oxide, metal halide.

10. Porphyrins of the structure XI

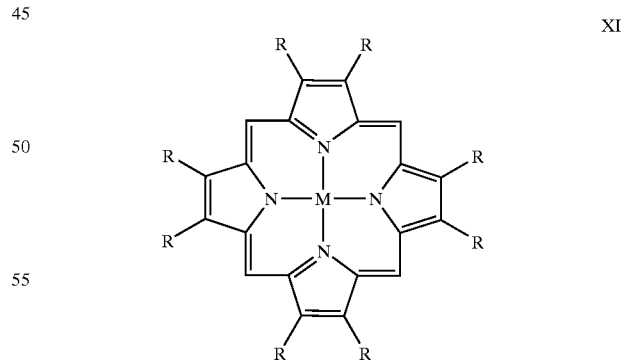

where R stands for Alk, Ar, $C_6F_5$, $C_6H_{11}$; M stands for 2H, Mg, AlCl, $Fe^{+3}$ etc.

When producing fluorescent composition, film-forming polymers exhibiting high transparency, easily penetrating pits and easily removable from the substrate surface are used. They include the following high-molecular compounds:

1. Polyvinylacetals, carbochain polymers of the general structure XII

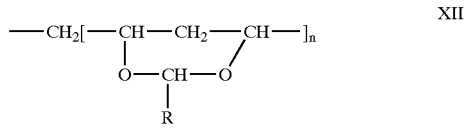

where R stands for H, $CH_3$, $C_2H_5$, $C_3H_7$, $C_4H_9$. This group includes polyvinylbutyral containing 55 to 75 mol. % of butyral group and having a glass transition temperature of 55° C.; polyvinylformal with an acetalization degree of 75 to 85 mol. %; and polyvinylethylal. These polymers may be used together with phenol-formaldehyde resins.

2. Acrylic resins—polymers or acrylic and metacrylic esters and copolymers of alkylacrylates with acrylic or metacrylic acid of the general structure XIII,

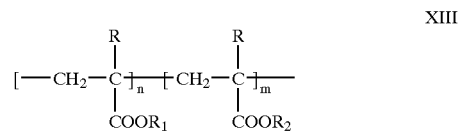

where R stands for H, $CH_3$; $R_1$ and $R_2$ stand for Alk; $R_1$ stands for Alk; $R_2$ stands for H; and n/m=1 to 4. This group includes polymetylmetacrylate, polybutylmetacrylate, and metylmetacrylate- or butylmetacrylate-metacrylic acid copolymers.

3. Cellulose ethers and esters of the general structure $[C_6H_7O_2(OR)_3]_n$ (XIV) and $[C_6H_7O_2(OCOR)_3]_n$ (XV), respectively, including ethyl cellulose with $\gamma=230-260$ (where $\gamma$ is the number of substituted hydroxyl groups per 100 glycoside residues of the cellulose macromolecule), cellulose acetobutyrate, and cellulose nitrate (with a nitrogen content of 9–11%).

Apart from this, phenol-formaldehyde resins (resols and novolacs), melamine-formaldehyde resins, urea-formaldehyde resins, and polyvinylacetate may be used as film-forming polymers for fluorescent compositions.

Solvents being used for fluorescent compositions wet the substrate surface well, help composition penetration into the pits, but do not interact with the substrate material and produce no pit deformation. When polycarbonate disks are used, only dioxane and aliphatic alcohols, methanol, ethanol, propanol, isopropanol, isobutanol, pentanol and their mixtures may be used as solvents.

Film-forming polymers proposed in the present invention exhibit various ranges of a highly elastic state and, therefore, provide different plasticity of coatings. An inadequate plasticity of the polymer hinders the penetration of the fluorescent composition in small pits of size 0.1–1.0 μm. In such cases, plastifiers are used. As plastifiers allow the decrease of the flow point and glass transition temperature, as well as the elasticity modulus of fluorescent composition, proposed are phtalic esters (including dibutyl phtalate and dioctyl phtalate), sebacic esters (including dibutyl sebacate and di-(2-ethyl-hexyl)sebacate), and phosphate esters (including tributyl phosphate and tricresyl phosphate). These plastifiers form true solutions in fluorescent compositions and produce no blurring when storing or using disks.

To improve the substrate and pit surface wettability with the fluorescent composition solution, as well as the solution spreadability, surfactants reducing the surface tension at the solid–liquid interface are used. As surfactants, non-ionogenic compounds like Tritons X and FC-430 and FC-431 Fluorosurfactants produced by the 3M Company can be used.

As light-stabilizers, HALS (Hindered Amine Light Stabilizers), in particular, Tinuvins 292, 144, 622, and 770 are used.

Multilayer optical disks are manufactured using adhesives which provide a good shrinkage-free adhesion of the surfaces being connected, produce no adverse effect on the properties of fluorescing pits and signal-to-noise ratio, transparent for laser excitation and fluorescence light. These requirements are met by UV-light cured optical adhesives, preferably P-92, UV-71, UV-69, UV-74, J-91, VTC-2, SK-9, from Summers Laboratories, Collegeville, Pa.

EXAMPLE 1

To produce a fluorescent composition, the following ethyl alcohol solutions are prepared:

| Compound | Concentration, g/l |
| --- | --- |
| Polyvinylbutiral | 50 |
| Oxazine 1 | 8.5 |
| Dioctyl phtalate | 30 |
| Triton X-45 | 1.0 |
| Tinuvin 292 | 10 |

These alcohol solutions are mixed in proportions providing the following concentrations of components:

| Compound | Concentration |
| --- | --- |
| Polyvinylbutiral (PVB) | 10 g/l |
| Oxazine 1 | 1.3 wt. % w.r.t. PVB |
| Dioctyl phthalate | 20 wt. % w.r.t. PVB |
| Triton X-45 | 0.03 wt. % w.r.t. PVB |
| Tinuvin 292 | 0.5 wt. % w.r.t. PVB |

The composition solution is filtered, allowed to stand at 40° C. for aeration and applied by spinning to a pitted polycarbonate disk at 60° C. Having been exposed for 20 minutes, the fluorescent composition layer is treated with ethyl alcohol for 20 seconds while remaining on the spinner. The produced fluorescence disk has the data pit background noise contrast ratio $\gamma=6$, as compared to $\gamma=1.3$ for usual disks with reflection-based reading. The fluorescent composition has an absorption maximum at 645 nm and a fluorescence maximum at 680 nm and is therefore suitable for fluorescence reading by diode laser with an emission wavelength of 640 nm.

EXAMPLE 2

A composition similar to that of Example 1, except that nile blue (perchlorate) is used as a fluorescing dye. A 6.3-g/l solution in ethyl alcohol is taken in proportion giving a concentration of 1.0 wt. % w.r.t. PVB. The produced fluorescence disk has a contrast ratio $\gamma=5$. The fluorescent composition has an absorption maximum at 630 nm and a fluorescence maximum at 665 nm.

EXAMPLE 3

A composition similar to that of Example 1, except that cyanine dye HITC (iodide) is used as a fluorescing dye. A 5.1-g/l solution in ethyl alcohol is taken in proportion giving a concentration of 0.8 wt. % w.r.t. PVB. The produced fluorescence disk has a contrast ratio γ=7. The fluorescent composition has an absorption maximum at 640 nm and a fluorescence maximum at 680 nm.

EXAMPLE 4

A composition similar to that of Example 1, except that cyanine dye HITC (perchlorate) is used as a fluorescing dye. A 5.3-g/l solution in ethyl alcohol is taken in proportion giving a concentration of 0.7 wt. % w.r.t. PVB. The produced fluorescence disk has a contrast ratio γ=7. The fluorescent composition has an absorption maximum at 755 nm and a fluorescence maximum at 800 nm and is suitable for fluorescence reading by diode laser with an emission wavelength of 780 nm.

EXAMPLE 5

Compositions similar to those in Examples 1–4. Ethanol-2-isobutanol mixture (7:1.5:1.5) is used as a solvent, methacrylate copolymer resin 2550 (Elvacite acrylic resins, DuPont) with a concentration of 7.5 g/l is used as a film-forming polymer, and dioctyl phtalate with a concentration of 40 wt. % w.r.t. copolymer 2550 is used as a plastifier. In these fluorescent compositions, Triton X-45 and Tinuvin 292 are not used. Using oxazine 1 as a fluorescent dye gives γ=5, nile blue gives γ=4, HIDC (iodide) gives γ=5, and HITC (perchlorate) gives γ=5.

EXAMPLE 6

Compositions similar to those in Example 5, except that 5-g/l solution of polyvinylacetate is used as a film-forming polymer. Using oxazine 1 as a fluorescent dye gives γ=9, nile blue gives γ=8, HIDC (iodide) gives γ=10, and HITC (perchlorate) gives γ=9.

EXAMPLE 7

To produce a multilayer optical disk of CD ROM type with fluorescence reading, as shown in FIG. 1, a single-layer disk 1 of 120 μm thickness with pits 3 filled with the fluorescent composition 5 prepared according to Example 1, 2, 3, 4, 5 or 6 is covered with a layer 7 of UV-69 adhesive, and a similar fluorescence disk 9 with a polycarbonate substrate of 30 μm thickness is glued thereto. The adhesive is cured with UV light 11. In just the same way, as shown in FIG. 2, another eight disks 9 similar to the second one are sequentially glued. This process gives a 10-layer fluorescence disk 13 with the bottom layer contrast ratio at least 5.

While various embodiments have been set forth above, those skilled in the art who have reviewed this disclosure will readily appreciate that other embodiments can be realized within the scope of the present invention. For example, disclosures of the number and thicknesses of layers, the concentrations of various materials, the choice of a substrate material, and the like should be understood as illustrative rather than limiting. Therefore, the present invention should be construed as limited only by the appended claims.

What is claimed is:

1. A fluorescent composition for manufacture of a single-layer optical disk of CD-ROM type with fluorescence reading, the fluorescent composition comprising:
   at least one fluorescent dye;
   at least one film-forming polymer;
   a plastisizer; and
   an organic solvent.

2. The fluorescent composition of claim 1, further comprising: a surfactant; and a light stabilizer.

3. The fluorescent composition of claim 1, wherein the fluorescent dye is in a concentration of 0.001–0.1 mole per kg of the film-forming polymer.

4. The fluorescent composition of claim 3, wherein the fluorescent dye is selected from the group consisting of xanthene dyes of the eosine group, xanthene dyes of the rhodamine group, acridine dyes, oxazine dyes, azine dyes, indigoide dyes, perylene dyes, violanthron dyes, cyanine dyes, phthalocynanine dyes, and porphyrins.

5. The fluorescent composition of claim 1, wherein the film-forming polymer is in a concentration of 2.0–50.0 g/l.

6. The fluorescent composition of claim 5, wherein the film-forming polymer is selected from the group consisting of polyvinylacetals, acrylic resins, cellulose ethers, cellulose esters, phenol-formaldehyde resins, melamine-formaldehyde resins, urea-formaldehyde resins, and polyvinylacetate.

7. The fluorescent composition of claim 6, wherein the plasticizer is in a concentration of 1.0–50.0 wt. % with respect to the film-forming polymer.

8. The fluorescent composition of claim 7, wherein the plasticizer is selected from the group consisting of phthalic esters, sebacic esters, and phosphate esters.

9. The fluorescent composition of claim 1, wherein the surfactant comprises a non-ionogenic compound in a concentration of 0.01–2.0 wt. % with respect to the film-forming polymer.

10. The fluorescent composition of claim 2, wherein the light stabilizer comprises HALS (Hindered Amine Light Stabilizer) in a concentration of 0.1–2.0 wt. % with respect to the film-forming polymer.

11. The fluorescent composition of claim 1, wherein the organic solvent is selected from the group consisting of methanol, ethanol, isopropanol, pentanol and mixtures thereof.

12. A method of manufacturing a CD-ROM type optical disk, the method comprising:
   providing a substrate which is formed as a disk which has a surface, said surface is covered with pits; and
   applying a fluorescent composition by spin coating, roller coating, or dip costing to the surface of the substrate so as to fill the pits with the fluorescent composition, while the surface outside the pits remains free of the fluorescent composition and does not fluoresce.

13. The method of claim 12, wherein the pits are 0.1–1.0 micrometers deep.

14. The method of claim 13, wherein the pits are 0.3–0.5 micrometers deep.

15. The method of claim 12, further including the steps:
   forming a plurality of single-layer disks with filled pits; and
   sequentially affixing the plurality of single-layer disks onto one another.

16. The method of claim 15, wherein the plurality of single-layer disks are affixed onto one another by gluing.

17. The method of claim 16, wherein the plurality of single-layer disks are formed and glued to one another such that the multi-layer disk comprises active layers alternating with inactive layers.

18. The method of claim 17, wherein the inactive layers are 20–50 micrometers thick.

19. The method of claim 18, wherein the inactive layers are transparent to a wavelength of light used to cause the fluorescent composition to fluoresce and to a wavelength of light given off by the fluorescent composition when the fluorescent composition fluoresces.

20. The method of claim 16, wherein the single-layer disks are glued onto one another with a UV-light cured optical adhesive.

21. The method of claim 20, wherein the UV-cured optical adhesive is selected from the group consisting of P-92, UV-69, UV-71, UV-74, J-91, VTC-2, and SK-9 adhesives.

22. A fluorescent CD-ROM optical disk comprising at least one substrate, said substrate containing pits wherein said pits are filled or coated with a fluorescent composition, said fluorescent composition comprising a fluorescent dye, a film-forming polymer and a plasticizer.

23. The optical disk of claim 22, wherein the fluorescent composition further comprises a surfactant and a light stabilizer.

24. The optical disk of claim 23, wherein the fluorescent dye of the fluorescent composition is in a concentration of about 0.001–0.1 mole per kg of the film forming polymer.

25. The optical disk of claim 22, wherein the film forming polymer is in a concentration of about 2.0–50.0 g/l.

26. The CD-ROM optical disk of claim 25, wherein the film forming polymer is selected from the group consisting of polyvinylacetals, acrylic resins, cellulose ethers, cellulose esters, phenol-formaldehyde resins, melamine-formaldehyde resins, urea-formaldehyde resins, and polyvinylacetate.

* * * * *